(12) United States Patent
Mozer et al.

(10) Patent No.: US 6,999,927 B2
(45) Date of Patent: *Feb. 14, 2006

(54) SPEECH RECOGNITION PROGRAMMING INFORMATION RETRIEVED FROM A REMOTE SOURCE TO A SPEECH RECOGNITION SYSTEM FOR PERFORMING A SPEECH RECOGNITION METHOD

(75) Inventors: Todd F. Mozer, Los Altos Hills, CA (US); Forrest S. Mozer, Berkeley, CA (US)

(73) Assignee: Sensory, Inc., Sunnyvale, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 10/687,214

(22) Filed: Oct. 15, 2003

(65) Prior Publication Data

US 2004/0083103 A1    Apr. 29, 2004

Related U.S. Application Data

(63) Continuation of application No. 10/051,838, filed on Jan. 16, 2002, now Pat. No. 6,665,639, which is a continuation of application No. 09/328,656, filed on Jun. 9, 1999, now abandoned, which is a continuation-in-part of application No. 08/822,852, filed on Mar. 24, 1997, now abandoned.

(60) Provisional application No. 60/032,788, filed on Dec. 6, 1996.

(51) Int. Cl.
G10L 15/06 (2006.01)

(52) U.S. Cl. ...................... 704/244; 704/252

(58) Field of Classification Search ............... 704/243, 704/244, 232, 251, 253, 259, 270, 275; 368/63, 368/281; 706/25, 39
See application file for complete search history.

(56) References Cited

U.S. PATENT DOCUMENTS 3,742,143 A   6/1973  Awipi
4,049,913 A   9/1977  Sakoe (Continued)

OTHER PUBLICATIONS

Bell, H.A. and D. Hull, an Equipment Concept for Speech Recognition, Colloquium on "Some Aspects of Speech Recognition for Man-Machine Communications," London, UK, Apr. 23, 1968, Institute of Elect. Engineers, 1968.

(Continued)

*Primary Examiner*—Abul K. Azad
(74) *Attorney, Agent, or Firm*—Fountainhead Law Group (57) ABSTRACT

Embodiments of the present invention include a speech recognition method. In one embodiment, the method includes receiving from an external system first recognition information to recognize a first plurality of words in a first system, programming the first system with the first recognition information to recognize the first plurality of words, generating first recognition results in response to receiving at least one of the first plurality of words in the first system, receiving from the external system second recognition information to recognize a second plurality of words, wherein the second recognition information is selected based on the first recognition results, and programming the first system with the second recognition information to recognize a second plurality of words.

104 Claims, 4 Drawing Sheets

U.S. PATENT DOCUMENTS

| | | | |
|---|---|---|---|
| 4,388,495 | A | 6/1983 | Hitchcock |
| 4,882,685 | A | 11/1989 | Van der Lely |
| 5,281,143 | A | 1/1994 | Arad et al. |
| 5,285,552 | A | 2/1994 | Leifeld et al. |
| 5,297,183 | A | 3/1994 | Bareis et al. |
| 5,313,531 | A | 5/1994 | Jackson |
| 5,355,433 | A | 10/1994 | Yasuda et al. |
| 5,444,673 | A | 8/1995 | Mathurin |
| 5,475,792 | A | 12/1995 | Stanford et al. |
| 5,513,298 | A | 4/1996 | Stanford et al. |
| 5,528,728 | A | 6/1996 | Matsuura et al. |
| 5,583,964 | A | 12/1996 | Wang |
| 5,600,753 | A | 2/1997 | Iso |
| 5,621,862 | A | 4/1997 | Nakahira et al. |
| 5,625,707 | A | 4/1997 | Diep et al. |
| 5,634,087 | A | 5/1997 | Mammone et al. |
| 5,696,877 | A | 12/1997 | Iso |
| 5,737,485 | A | 4/1998 | Flanagan et al. |
| 5,749,066 | A | 5/1998 | Nussbaum |
| 5,790,754 | A | 8/1998 | Mozer et al. |
| 5,794,204 | A | 8/1998 | Miyazawa et al. |
| 5,794,205 | A | 8/1998 | Walters et al. |
| 5,812,992 | A | 9/1998 | Vries |
| 5,813,026 | A | 9/1998 | Borg et al. |
| 5,915,001 | A | 6/1999 | Uppaluru |
| 5,920,852 | A | 7/1999 | Graupe |
| 6,021,387 | A | 2/2000 | Mozer et al. |
| 6,151,592 | A | 11/2000 | Inazumi |
| 6,205,556 | B1 | 3/2001 | Watanabe et al. |
| 6,665,639 | B1 * | 12/2003 | Mozer et al. ............... 704/244 |

OTHER PUBLICATIONS

Bezdel, W. and R.W.A. Scarr, Approaches to Speech Recognition Equipment Based on Zero Crossings and Other Speech Features, Colloquium on "Some Aspects of Speech Recognition for Man-Machine Communications," London, UK, Apr. 23, 1968, Institute of Elect. Engineers, 1968.

Bunge; E., Automatic Speaker Recognition By Computers, 1975 Carnahan Conference On Crime Countermeasures, ed. J.S. Jackson, pp 23-28, 1975.

Fawe, A.L. Reconnaissance De Le Parole A Partir Des Passages Par Zero, Revue HF, vol. 10, pp 296-298, 1978. The Abstract is provided entitled "Word Recognition by Zero Crossings" (one page).

Fry, D.B., Prospects and Problems in Mechanical Speech Recognition, Colloquium on "Some Aspects of Speech Recognition for Man-Machine Communications," London, UK, Apr. 23, 1968, Institute of Elect. Engineers, 1968.

Glenn, J.W., and M.H. Hitchcock, With a Speech Pattern Classifier, Computer Listens to Its Master's Voice, Electronics, vol. 44, pp 84-89, 1971.

Lavington, S.H., Problems in Automatic Speech Recognition, Colloquium on "Some Aspects of Speech Recognition for Man-Machine Communications," London, UK, Apr. 23, 1968, Institute of Elect. Engineers, 1968.

Lenaerts, E. H., Talking to The Computer, New Scientist, vol. 44, 498-501, 1969.

Lummis, R.C., Speaker Verification: A Step Toward, The 'Checkless' Society, Bell Laboratories Record, vol. 50, pp. 254-259, 1972.

Makhoul, J.I., Speaker-Machine Interaction In a Limited Speech Recognition System, Proceedings of the 78th Meeting of the Acoustical Society of America, San Diego, CA, Acoustical Society of America, New York, 1969.

Neiderjohn, R.J. and P.F. Castelaz, Zero-Crossing Analysis Methods for Speech Recognition, Proceedings of the 1978 Conference on Pattern Recognition and Image Processing, IEEE, pp 507-513, 1978.

Newal, A.F., Spectral Analysis Using a Filter Bank and PDP8 Computer, Colloquium on "Some Aspects of Speech Recognition for Man-Machine Communications," London, UK, Apr. 23, 1968, Institute of Elect. Engineers, 1968.

Pay, B.E., User Requirements of Speech Recognition Machines, Colloquium on "Some Aspects of Speech Recognition for Man-Machine Communications," London, UK, Apr. 23, 1968, Institute of Elect. Engineers, 1968.

Purton, R.F., An Automatic Word Recognizer Based on Autocorrelation Analysis, Colloquium on "Some Aspects of Speech Recognition for Man-Machine Communications," London, UK, Apr. 23, 1968, Institute of Elect. Engineers, 1968.

Raibiner, "Applications of Voice Processing to Telecommunications," *Proceedings of the IEEEi*, vol. 82, No. 2 (Feb. 1994), pp. 199-228.

Reddy, D.R., Speech Input Terminals for Computers: Problems and Prospects, Proceedings of the 1970 IEEE International Computer Group Conference, IEEE, p. 282-289, 1970.

Rochester, L.R., J.N. Gowdy, and J.K. Bryan, Comparison of Speech Recognition Systems Based on FFTs and Zero Crossings, Proceedings of Southeastcon, IEEE, pp 178-181, 1979.

Sambur, M.R., and L.R. Rabiner, A Speaker-Independent Digit-Recognition System, Bell System Technical Journal, vol. 54, pp 81-102, 1975.

Turn, R.A. Hoffman, and T. Lippiatt, Military Applications of Speech Understanding Systems, Rand Corp., Santa Monica, CA 1974.

Yasaki, E.K., Voice Recognition Comes of Age, Datamation, pp 65-68, 1976.

* cited by examiner

SPEECH RECOGNITION PROGRAMMING INFORMATION RETRIEVED FROM A REMOTE SOURCE TO A SPEECH RECOGNITION SYSTEM FOR PERFORMING A SPEECH RECOGNITION METHOD

CROSS-REFERENCES TO RELATED APPLICATIONS

This application is a continuation of and claims the benefit of U.S. patent application Ser. No. 10/051,838, filed Jan. 16, 2002, now U.S. Pat. No. 6,665,639, which is continuation of and claims the benefit of U.S. patent application Ser. No. 09/328,656, filed Jun. 9, 1999, now abandoned, which is a continuation-in-part of and claims the benefit of U.S. patent application Ser. No. 08/822,852, filed Mar. 24, 1997, now abandoned, which claims priority from U.S. Provisional Application Ser. No. 60/032,788, filed Dec. 6, 1996. The Ser. Nos. 10/051,838, 09/328,656, 08/822,852, and 60/032,788 are hereby incorporated herein by reference.

BACKGROUND OF THE INVENTION

The present invention relates to speech recognition and more particularly to inexpensive and user friendly speech recognition techniques.

Speech recognition has been extensively studied for several decades because of its interest on intellectual grounds and because of its military and commercial applications. Some of the commercial applications involve speaker verification and improving the man-machine interface (e.g., U.S. Pat. Nos. 3,742,143; 4,049,913; 4,882,685; 5,281,143; and 5,297,183). As evidence of the extensive research on speech recognition, the U.S. Patent Office has granted more than 600 patents on speech recognition or related topics in the last three decades and as many as 10,000 articles have appeared in the scientific or engineering literature during that time.

Generally, a speech recognition device analyzes an unknown audio signal to generate a pattern that contains the acoustically significant information in the utterance. This information typically includes the audio signal power in several frequency bands and the important frequencies in the waveform, each as a function of time. The power may be obtained through the use of bandpass filters (e.g., U.S. Pat. No. 5,285,552) or fast Fourier transforms (i.e., FFTs) (e.g., U.S. Pat. No. 5,313,531). The frequency information may be obtained from the FFTs or by counting zero crossings in the filtered input waveform (U.S. Pat. No. 4,388,495).

Speech recognition devices can be classified as "speaker dependent" or "speaker independent." Speaker dependent devices require that the user train the system by speaking all of the utterances in the entire recognition set several times. Speaker independent devices do not require such training because the acoustic cues obtained from many repetitions of the utterances in the recognition set, as spoken by many different speakers, are used to train the recognizer to recognize an unknown utterance by a speaker whose phrase was not part of the training set.

Commercial applications of both speaker independent and speaker dependent recognition are becoming prevalent for applications such as voice activated phone dialing, computer command and control, telephone inquiries, voice recorders, electronic learning aids, data entry, menu selection, and data base searching. The growth of the speech recognition marketplace results from the decreasing cost of computing power and recognition technology as well as the need for more friendly user interfaces.

In some applications, speaker dependent recognition is required because the user must input information that he/she later requests. An example is voice dialing, which is being test marketed by U.S. West among others, in which the user verbally enters a directory of names and phone numbers. This information is later solicited by using speaker dependent recognition when the user wishes to make a phone call. Except for applications such as voice dialing that require speaker dependent recognition, this technology has not achieved wide market acceptance because it is not user-friendly due to the required training.

Much of the interest in speaker independent recognition is because of the simpler user interface. An example of a speaker independent recognition software package running on personal computers is VOICE Release 2.0 from Kurzweil AI, which is able to recognize as many as 60,000 words without user training. Other examples of similar technologies are the IBM Voice Type 3.0, used in radiology, the Wild Card LawTALK, used in legal applications, and the Cortex Medical Management, used for anatomic pathology. More than two dozen speaker independent recognition computer products are available and they all require considerable computing power to perform the sophisticated natural language processing involving context, semantics, phonetics, prosody, etc., that is required to recognize very large sets of utterances without user training. Hence, large vocabulary, speaker independent recognition products require considerable computing power.

Small vocabulary, speaker independent recognition also appears in commercial applications where the number of utterances to be recognized is limited. Examples are the Sensory, Inc. speaker independent recognition LSI chip (U.S. Pat. No. 5,790,754) used in electronic learning aids such as the Fisher-Price Radar product, or in time setting applications such as the VoiceIt clock. This technology is accurate and inexpensive but, in the current art, it is limited to use with relatively small vocabularies because the LSI chip does not contain the computing power required for natural language processing or the memory required to store information about a very large inventory of recognition words.

The above described limitations of current recognition technology narrow the range of its applicability in consumer electronic products. For example, it would be desirable to select a particular song from a compact disk changer that holds many compact disks by telling it which disk and which song on that disk you wish to hear. This is not currently feasible because solving this problem with speaker dependent recognition requires that the user repeat the names of all recordings on every compact disk that he owns, while solving it with speaker independent technology would require that the recognizer be able to understand the name of every song on every compact disk in the world. Or, consider the use of speech recognition during the interaction of a surfer with an internet website. Most of this interaction is at a simple one-step-at-a-time level where the vocabulary to be recognized at each step is small but the total vocabulary associated with all of the steps may be large. For this application, speaker dependent recognition may not be feasible because of its inconvenience. Speaker independent recognition is feasible, but, in the current art, analyzing the speech by the web site's main processor creates conflicts between the recognition program and the application and may slow down the application to the point that use of recognition becomes unacceptable to the user. Also, adding additional processing power to handle the speaker independent recognition may not be feasible due to its cost.

SUMMARY

The present invention provides an inexpensive and user-friendly speaker independent speech recognition system. A speech recognition system according to the present invention may function without the use of natural language processing or internal storage of large amounts of speech recognition data.

In one embodiment, an inexpensive, speaker independent recognition engine is placed in the base unit of an electronic apparatus. Depending on the application, the base unit may be a compact disk player, computer, internet access device, video game player, television set, telephone, etc. The recognition engine may be a software program running in a general purpose microprocessor or an LSI chip such as the Sensory RSC-164 available from the assignee of the present application. Since the recognition engine should be inexpensive, it may be capable of recognizing only a limited set of utterances at any one time, although this recognition set of utterances may change from one application of recognition to the next in the same base unit.

The architecture of the product is such that, in operation, an external medium is connected to the base unit. The external medium may be a compact disk if the base unit is a compact disk changer, a floppy disk if the base unit is a computer, a video game cartridge if the base unit is a video game player, a cable or rf transmission if the base unit is a television set or an internet access device, a phone cable if the base unit is a telephone, etc. Included in the information provided to the base unit by the external medium is the data required for the recognition engine to recognize a spoken utterance from a limited set of candidate utterances. As the interaction between the base unit and the user progresses, different sets of data may be supplied by the external medium to the recognition engine in the base unit in order to allow different recognition sets at different times in the interaction.

Or, in some applications, only one or two data sets might ever be supplied from the external medium to the base unit. Consider the case of a watch that utilizes speech recognition for setting the time. To function, this watch might require two speaker-independent recognition sets, the first of which would be the digits, and the second of which would be the words "set," "hours," "minutes," "seconds," and "done." A problem is that worldwide sales require that this watch perform speech recognition in any of dozens of languages. In the current art, this would require either that the watch manufacturer and retailers carry inventories of a large number of different units or that the watch is loaded with information in many languages, at an unacceptable expense. An alternative approach would be to include a small amount of programmable, non-volatile memory in the watch, and to download, from the Internet, the pertinent information for whatever language a purchaser wishes his watch to recognize. The voice prompts required to guide the user through setting the time would also be downloaded in the language of the user's choice in the same way. Downloading information to devices from the Internet is already a normal operation and watches with infra-red interfaces to computers are available in the market.

In accordance with a first aspect of the present invention, a base unit is provided wherein features of spoken utterances are analyzed by a programmable pattern recognition system to provide recognition results. A method of operating the base unit includes steps of programming the pattern recognition system to recognize a first set of words, operating the pattern recognition system as programmed to generate at least a first recognition result responsive to input speech, retrieving programming information for the pattern recognition system from a source external to the base unit responsive to the first recognition result and reprogramming the pattern recognition system to recognize a second set of words selected responsive to the first recognition result.

In accordance with a second aspect for he present invention, a method for speaker-independent speech recognition includes steps of performing speaker-independent speech recognition of user utterances in a base unit, receiving, in the base unit, first information pertinent to the speech recognition from an external medium, and receiving, in the base unit, second information independent from the first information and related to the user utterances from the external medium.

In accordance with a third aspect of the present invention, a method for speaker-independent speech recognition includes steps of downloading from an external medium into a base unit the information required for the speech recognition to operate in a selected one or a few of several different languages.

A further understanding of the nature and advantages of the inventions here may be realized by reference to the remaining portions of the specification and the attached drawings.

DETAILED DESCRIPTION

Figure 1:
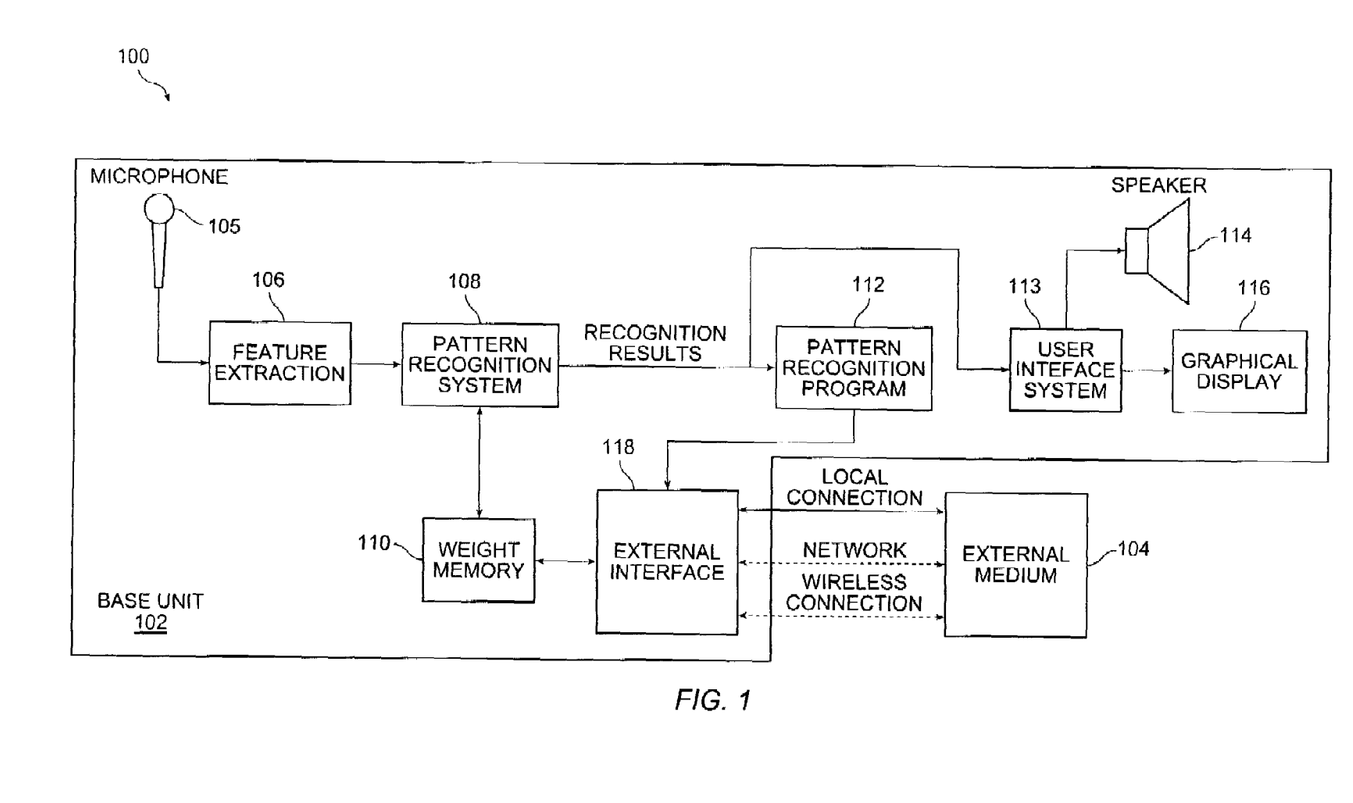
FIG. 1 depicts a general representation of an apparatus incorporating speech recognition according to one embodiment of the present invention.

FIG. 1 depicts a general representation of an apparatus 100 incorporating speech recognition according to one embodiment of the present invention. Apparatus 100 includes a base unit 102 and an external medium 104. Apparatus 100 may provide speech recognition capabilities to, for example, various electronic appliances such as a compact disk changer, telephone, computer, television, watch, etc. Components of apparatus 100 may perform other functions besides speech recognition in the context of such appliances.

Base unit 100 includes a microphone 105, a feature extraction unit 106, a programmable pattern recognition system 108, a weight memory 110, a pattern recognition programmer 112, a user interface system 113, a speaker 114, a graphical display 116, and an external interface 118. It is to be understood that not all of these elements are required for any particular embodiment of the present invention. Also, many of the depicted elements are implementable in either hardware or software.

Microphone 105 accepts user speech utterances and converts them to an analog electrical signal. Feature extraction unit 106 converts the analog electrical signal to digital information and extracts features which characterize the input utterances to facilitate recognition. Feature extraction unit 106 may be implemented in any one of a number of ways in either hardware or software. One preferred implementation of feature extraction unit 106 is taught in co-assigned U.S. Pat. No. 5,790,754, the contents of which are herein incorporated by references for all purposes.

Pattern recognition system 108 recognizes the spoken utterances based on the features extracted by feature extraction unit 106. Preferably, pattern recognition system 108 is a neural network that employs weights from weight memory 110. An example of such a neural network is found in U.S. Pat. No. 5,790,754. Pattern recognition system 108 selects a recognition result for the input utterance from among members of a presently selected recognition set.

The weights have been previously developed by training the neural network with multiple examples of the specific utterances comprising the recognition set associated with these weights. For example, if the recognition set consists of the words "yes" and "no," several hundred examples of each of these words, collected from the same population that will use the product, might be used to train the neural network. Another set of weights might be associated with the digits from 0 through 9.

In accordance with the present invention, the recognition set and associated weight set may change over time. Thus, at a specific time in an application, pattern recognition system 108 might distinguish yes from no by using one weight set and, at another time, it might recognize the single digits by using the second weight set. In this way, a large number of different utterances can be recognized without any one recognition set being so large that a more sophisticated recognition engine is required.

Pattern recognition programming system 112 controls the selection of a current recognition set and weight set, at least partially in response to the recognition results generated by pattern recognition system 108. The user interface system presents output to the user through speaker 104 and/or graphical display 116. The information presented to the user may include prompts for input to microphone 105 or application specific information. User interface system 113 may incorporate a speech synthesis capability.

Pattern recognition programming system 112 employs external interface 118 to retrieve new recognition sets and weight sets into weight memory 110. External interface 118 may be a storage interface, e.g., an IDE or SCSI interface, a network interface as would be used with a local network, or a network interface to an internet or intranet. External interface 118 may also be modem for connection to a telephone line, a modem for connecting to a CATV network, or a wireless modem for sending and receiving electromagnetic transmissions. External medium 104 may be, e.g., a compact disk, a compact disk jukebox, a remote server, a web site, a floppy disk, a hard drive, a video game cartridge, etc. The connection between external interface 118 and external medium 104 may be a SCSI port, an IDE port, a telephone line, an intranet, the Internet, a CATV network, the airwaves, etc.

Software or computer code to implement any of the elements of FIG. 1 may be stored in, for example, a memory device, CD-ROM, floppy disk, hard drive, any computer-readable storage medium, etc.

Figure 2:
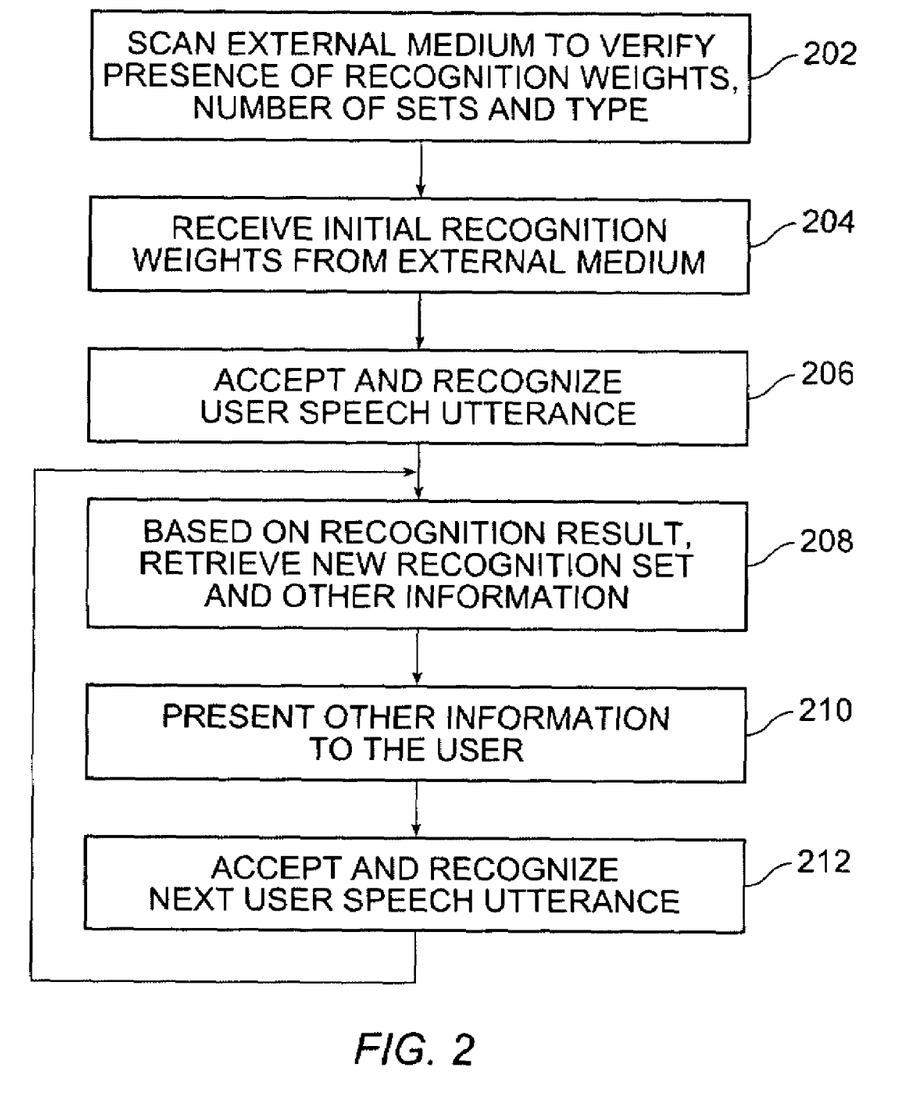
FIG. 2 is a flowchart describing steps of the operation of the apparatus of FIG. 1 in accordance with one embodiment of the present invention.

FIG. 2 is a flowchart describing steps of the operation of the apparatus of FIG. 1 in accordance with one embodiment of the present invention. At step 202, pattern recognition programming system 112 accesses external medium 104 to verify it in fact contains recognition set data and weight set data of the kind employed by pattern recognition system 108 and to determine the number of recognition sets and associated weight sets stored there. At step 204, pattern recognition programming system 212 retrieves an initial set of words and associated weight set into weight memory 110. At step 206, microphone 105 picks up a user's speech utterance. Feature extraction unit 106 develops a set of features to characterize the user utterance. Pattern recognition system 108 recognizes the utterance based on the weights currently stored on weight memory 110. The utterance may come in response to a prompt conveyed to the user by user interface system 113 via speaker 114 or graphical display 116.

At step 208, pattern recognition programming system 112 receives the recognition result and selects a new set of words and associated weight set based on this result. The new recognition set and weight set are transferred from external medium 104 to weight memory 110 through external interface 118. In some embodiments, other information, independent from the recognition set and weight set information, is also retrieved from external medium 104. At step 210, user interface system 113 presents this other information or the result of processing this other information to the user. For example, the information may be audio data, and user interface system 113 may play a song. Alternatively, the information may be video data and user interface system 113 may display an image, video program, or scene from a video game. At step 212, base unit 102 receives and recognizes a new user utterance but using the newly loaded recognition set and weight set information.

Steps 208, 210, and 212 repeat as often as required by the application. It is of course not necessary that new recognition weight set information be loaded after each utterance that is recognized. For example, the watch that sets time by use of speaker-independent recognition in any of several languages might have only one or two weight sets, pertinent to a specific language, downloaded from external medium 109 through step 204, once during the life of the watch.

Figure 3:
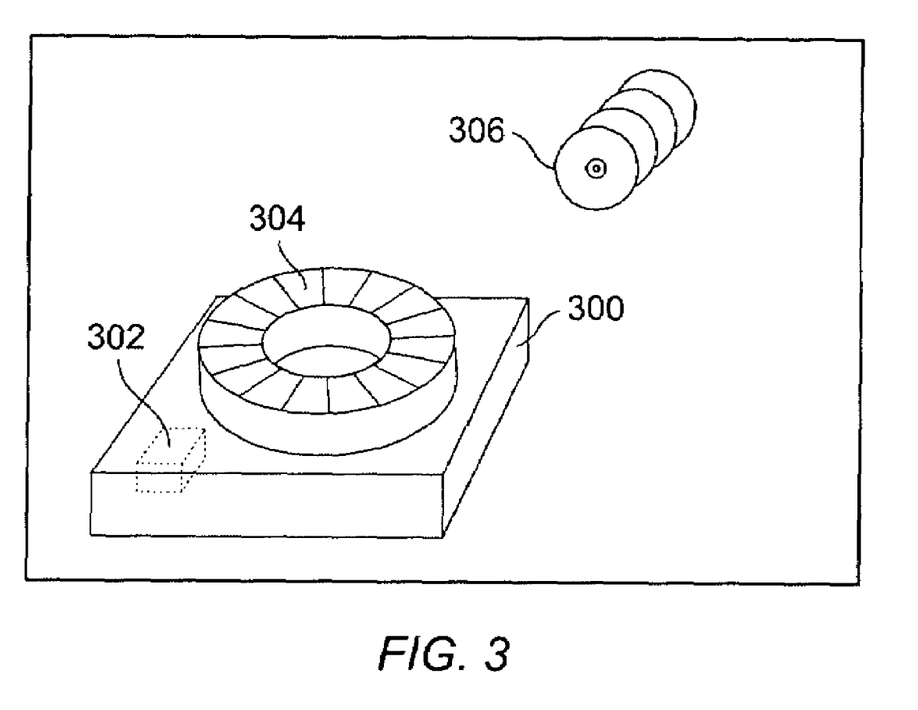
FIG. 3 depicts a particular example of the apparatus of FIG. 1, a compact disk changer enhanced in accordance with one embodiment of the present invention.

FIG. 3 depicts a particular example of the apparatus of FIG. 1, a compact disk changer enhanced in accordance with one embodiment of the present invention. A compact disk changer 300 incorporates the functionality of base unit 102 along with circuitry necessary for compact disk changer operation. An integrated circuit 302 includes feature extraction unit 106, pattern recognition system 108, and weight memory 110. Integrated circuit 302 is preferably the RSC-164 speech recognition LSI chip manufactured by Sensory, Inc., assignee of the present application. Integrated circuit 302 is also capable of synthesizing speech from stored data and this capability is utilized by the compact disk changer enhanced in accordance with the present invention. Attached to compact disk changer 300 is a "jukebox" 304, into which compact disks 306 may be loaded. Compact disks 306 perform the function of external medium 104. They store recognition weight data and other information in the form of audio data to be played.

The weight sets utilized by integrated circuit 302 are located in each of the compact disks 306. Jukebox 304 is assumed to be capable of storing as many as 24 compact disks and loading the selected disk for playing. Some of these 24 slots may be empty. For illustration, it is assumed that ten compact disks are in jukebox 304 and six of them are of the type that contain weight and recognition set information. Each of these six compact disks 306 contain weights for two sets of words, the first of which is the name of the compact disk and the second of which is the list of songs in that compact disk.

Figure 4:
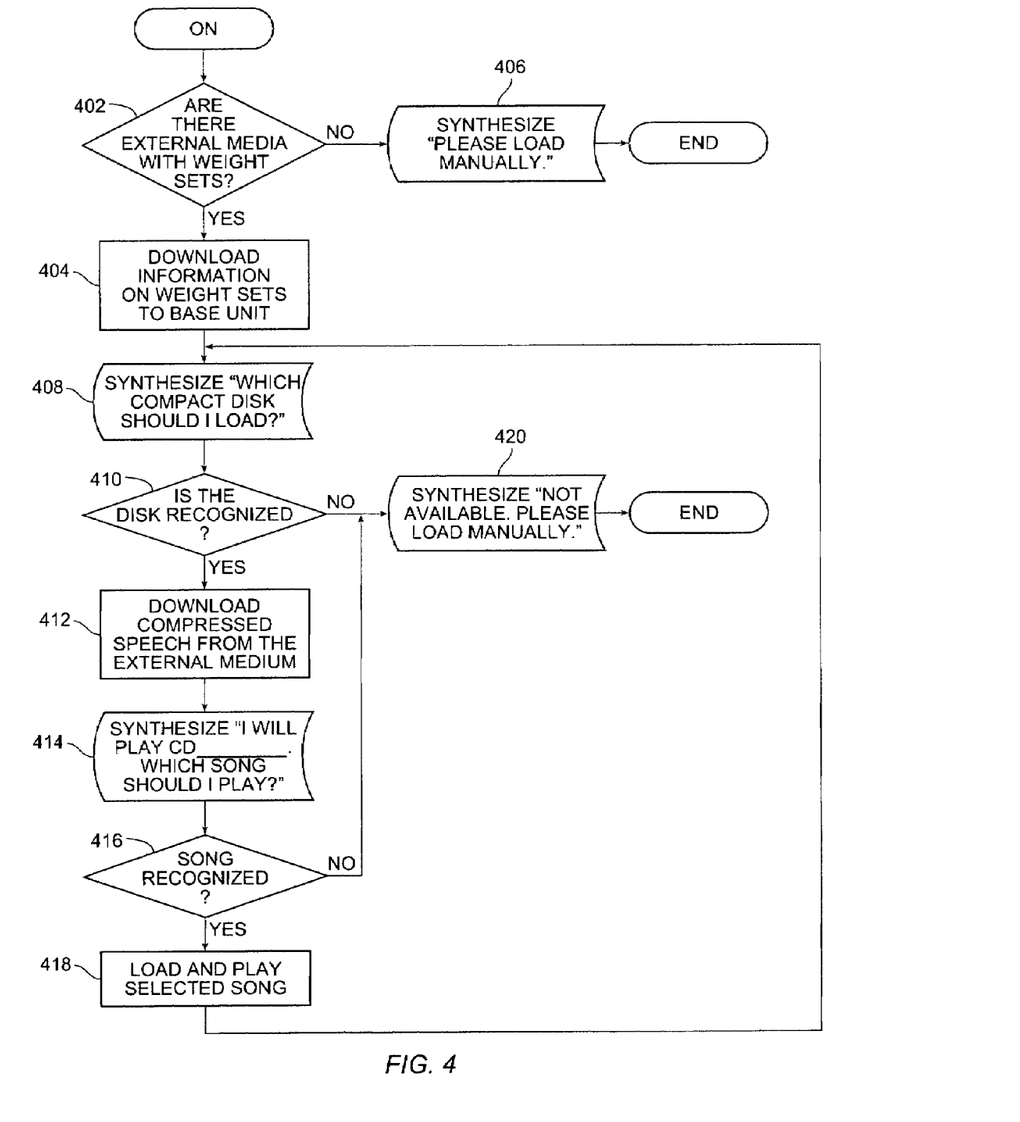
FIG. 4 depicts the operation of the compact disk changer of FIG. 3 in accordance with one embodiment of the present invention.

FIG. 4 depicts the operation of the compact disk changer of FIG. 3 in accordance with one embodiment of the present invention. After being turned on, at step 402, compact disk changer 300 scans external medium 304 and checks for appropriate signals from the six compact disks which indicate that they are of the type containing recognition weights. If the compact disks are of the correct type, compact disk changer 302 receives the required information on the number and type of weight sets in each of these compact disks at step 404. If the compact disks do not contain the weight set information, integrated circuit 302 synthesizes and outputs the spoken phrase "Please load manually" at step 406 to indicate that spoken control will not be possible.

At step 408, integrated circuit 302 then synthesizes and outputs the spoken phrase "Which compact disk should I load?" and it analyzes the audio response. The first weight set from each of the six compact disks 306 are downloaded into compact disk changer 300 and used by integrated circuit 302 to decide which of the compact disks was requested by the speaker at step 410. Suppose the compact disk with music by Montovani was selected. From that compact disk, compact disk changer 300 downloads speech data in compressed form at step 414 and generates "I will play CD Montovani." Also, at step 414, the Montovani compact disk is then loaded into the compact disk changer and integrated circuit 302 then generates the phrase "Which song should I play?" The second weight set on the Montovani compact disk is downloaded and used by integrated circuit 302 to determine which song was selected at step 416.

Compact disk changer 300 then downloads the appropriate audio data from the compact disk and plays this song at step 418 and repeats the above selection process by going to step 410. If a compact disk is requested that is not in jukebox 304 or if a song is requested that is not in the selected compact disk, integrated circuit 302 generates the phrase "Not available. Please load manually" at step 420.

Through use of the invention, a large number of utterances may be recognized by a relatively simple recognition engine because an over-large number of utterances is not contained in any recognition set. Furthermore, by use of the invention, devices that operate in a user-friendly manner are achieved because they require no training of the recognizer.

Another embodiment having features similar to those in the specific embodiment would be a computer that contains a recognition engine and that receives weight sets from software packages. In this way, the software manufacturer can add speech recognition to his word processor, spread sheet program, data base program, game, etc. For this application, external interface 118 operates to access a hard disk, CD-ROM, or floppy.

Similarly, Internet web sites can offer speech recognition by downloading weights, e.g., in the form of Java applets, to the local computer. This offers new possibilities for interactions such as learning. For example, suppose a child selects a web site for learning more about numbers. The site can download recognition sets, speech data, and screen graphics to the child's computer, which then displays a farm scene that includes 5 chickens. The downloaded speech can then say "How many chickens are there in the picture?" The child answers "five." The recognition program decides the answer and feeds this information to the web site, which sends new recognition information, speech, and graphics back to the local computer in order to say "You're right!" and to continue the interaction. This type of interactive learning tool is especially beneficial for children whose natural response is speech, not interactions with a mouse, joystick, or keyboard. For this application, external interface 118 would operate as a network interface or modem in combination with the well-known protocols for accessing the Internet.

Cable TV or satellite television transmissions can include recognition weights that are used by the receiving TV set to select programs through speech recognition. Through this capability, one can also play video games on the television set using speech as both a game output and user input during the game play, with both input and output speech synchronized with graphics on the TV screen. For this application, external interface 118 operates as an RF receiver, receiving both recognition weight information and other video and/or audio information.

While the above are complete descriptions of preferred and other embodiments of the invention, other arrangements and equivalents are possible and may be employed without departing from the true spirit and scope of the invention. The terms and expressions which have been employed here are used as terms of description and not of limitations, and there is no intention, in the use of such terms and expressions, of excluding equivalents of the features shown and described, or portions thereof, it being recognized that various modifications are possible within the scope of the appended claims and their full scope of equivalents.

What is claimed is:

1. A speech recognition method comprising the steps of:
retrieving a first set of recognition programming information associated with a first recognition word set from a remote source external to a first system;
programming the first system with said retrieved recognition programming information to recognize a first set of spoken words in the first recognition word set, and in accordance therewith, generating a first set of recognition results in response to said first set of words;
in response to the first set of recognition results, selectively retrieving from said remote external source a second set of recognition programming information associated with a second recognition word set, wherein the selectively retrieved second set of recognition programming information is selected based on the first set of recognition results; and
reprogramming the first system with said retrieved second set of recognition programming information to recognize a second set of spoken words in the second recognition word set.

2. The method of claim 1 wherein the first system is connected to the remote source over an internet.

3. The method of claim 1 wherein the first system is connected to the remote source over an intranet.

4. The method of claim 1 wherein the remote source is a server.

5. The method of claim 1 wherein the first system receives word sets from a web site.

6. The method of claim 1 wherein recognition is performed using speaker-independent speech recognition.

7. The method of claim 1 wherein the recognition programming information comprises neural network weights.

8. The method of claim 1 wherein the wherein the first system is connected to the remote source over a wireless connection.

9. A speech recognition method comprising:
receiving from an external system first recognition information to recognize a first plurality of spoken words in a first system;
programming the first system with the first recognition information to recognize the first plurality of words;

generating first recognition results in response to receiving at least one of the first plurality of words in the first system;

receiving from the external system second recognition information to recognize a second plurality of spoken words, wherein the second recognition information is selected based on the first recognition results; and programming the first system with the second recognition information to recognize the second plurality of words.

10. The method of claim 9 further comprising using a speaker to prompt a user to input at least one of the second plurality of words.

11. The method of claim 9 further comprising receiving data from the external system.

12. The method of claim 11 wherein the data is audio data.

13. The method of claim 11 wherein the data is video data.

14. The method of claim 9 wherein the first system is connected to the external system over an internet.

15. The method of claim 9 wherein the first system is connected to the external system over an intranet.

16. The method of claim 9 wherein the external system is a server.

17. The method of claim 9 wherein the first system receives the first and second plurality of words from a web site.

18. The method of claim 9 further comprising using a speaker to prompt a user to input at least one of the first plurality of words.

19. The method of claim 18 further comprising using a speaker to prompt a user to input at least one of the second plurality of words.

20. The method of claim 19 further comprising receiving data from the external system.

21. The method of claim 20 wherein the data is audio data.

22. The method of claim 20 wherein the first system is connected to the external system over an internet.

23. The method of claim 22 wherein the external system is a server.

24. The method of claim 22 wherein the first system receives the first and second plurality of words from a web site.

25. The method of claim 20 wherein the first system is connected to the external system over an intranet.

26. The method of claim 25 wherein the external system is a server.

27. The method of claim 25 wherein the first system receives the first and second plurality of words from a web site.

28. The method of claim 9 wherein recognition is performed using a speaker-independent speech recognition.

29. The method of claim 9 wherein recognition programming information comprises neural network weights.

30. The method of claim 9 wherein the first system includes means for recognizing speech and means for coupling the first system to the external system.

31. The method of claim 9 wherein the first system is a base unit.

32. The method of claim 9 wherein the first system includes a recognition engine.

33. The method of claim 32 wherein the recognition engine is a software program running in a general purpose microprocessor.

34. The method of claim 9 wherein the first system is a local computer and the external system is an internet web site, and the first and second recognition information are downloaded from the internet web site to the local computer to recognize the first and second plurality of words.

35. The method of claim 9 wherein the first system is connected to the external system over a wireless connection.

36. A speech recognition method comprising:

supplying a first system with first information from an external source, the first information for recognizing a spoken utterance in a first limited set of candidate utterances;

programming the first system with the first information to recognize the first limited set of candidate utterances;

generating first results in response to receiving a spoken utterance in the first limited set of candidate utterances in the first system;

supplying the first system with second information from the external source, the second information for recognizing a spoken utterance in a second limited set of candidate utterances, wherein the second information is selected based on the first results; and programming the first system with the second information to recognize the second limited set of candidate utterances.

37. The method of claim 36 wherein the first system includes a recognition engine.

38. The method of claim 37 wherein the recognition engine is a software program running in a general purpose microprocessor.

39. The method of claim 36 wherein the first system is a base unit.

40. The method of claim 39 wherein the base unit is an internet access device.

41. The method of claim 36 wherein the first system is connected to the external source over an internet.

42. The method of claim 36 wherein the first system is connected to the external source over an intranet.

43. The method of claim 36 wherein the external source is a server.

44. The method of claim 43 wherein the first system receives the first and second information from a web site.

45. The method of claim 36 wherein the first system is a local computer and the external source is an internet web site, and the first and second information are downloaded from the internet web site to the local computer for recognizing the first and second limited set of candidate utterances.

46. The method of claim 36 wherein the first system is connected to the external source over a wireless connection.

47. A speech recognition method comprising:

downloading first information to a first computer from a server, the first information including data to recognizing an utterance in a first limited set of candidate utterances;

programming the first computer with the first information to recognize the first limited set of candidate utterances;

receiving a spoken utterance in the first limited set of candidate utterances in the first computer;

generating first recognition results in response to receiving the spoken utterance;

downloading second information to the first computer from the server, the second information including data to recognizing an utterance in a second limited set of candidate utterances, wherein the second information is selected based on the first recognition results; and programming the first computer with the second information to recognize the second limited set of candidate utterances.

48. The method of claim 47 wherein the first computer includes a recognition engine.

49. The method of claim 48 wherein the recognition engine is a software program running in a general purpose microprocessor.

50. The method of claim 47 wherein the first computer is connected to the server over an internet.

51. The method of claim 47 wherein the first computer is connected to the server over an intranet.

52. The method of claim 47 wherein the first computer is connected to the server over a local network.

53. The method of claim 47 wherein the first computer receives the first and second information from a web site.

54. The method of claim 47 wherein the server is an internet web site, and the first and second information are downloaded from the internet web site to the first computer for recognizing the first and second limited set of candidate utterances.

55. The method of claim 47 further comprising receiving data from the server.

56. The method of claim 55 wherein the data is audio data.

57. The method of claim 55 wherein the data is video data.

58. The method of claim 47 further comprising prompting a user to input a spoken utterance in the first limited set of candidate utterances.

59. The method of claim 58 further comprising prompting a user to input a spoken utterance in the second limited set of candidate utterances.

60. The method of claim 47 wherein recognition is performed using speaker-independent speech recognition.

61. The method of claim 60 wherein the first and second information comprise neural network weights.

62. A computer-readable storage medium including software for performing a speech recognition method, the method comprising:
receiving in a first system from a second system first recognition information to recognize a first plurality of spoken words;
programming the first system with the first recognition information to recognize the first plurality of words;
generating first recognition results in response to receiving at least one of the first plurality of words in the first system;
receiving from the second system second recognition information to recognize a second plurality of spoken words, wherein the second recognition information is selected based on the first recognition results; and
programming the first system with the second recognition information to recognize a second plurality of words.

63. The method of claim 62 further comprising prompting a user to input at least one of the first plurality of words.

64. The method of claim 63 further comprising prompting a user to input at least one of the second plurality of words.

65. The method of claim 62 further comprising receiving data from the second system.

66. The method of claim 62 wherein the first system is connected to the second system over an internet.

67. The method of claim 62 wherein the first system is connected to the second system over an intranet.

68. The method of claim 62 wherein the first system is a local computer.

69. The method of claim 68 wherein the second system is a server.

70. The method of claim 62 wherein the first system receives the first and second plurality of words from a web site.

71. The method of claim 62 wherein recognition is performed using speaker-independent speech recognition.

72. The method of claim 62 wherein recognition programming information comprises neural network weights.

73. The method of claim 62 wherein the first system includes a recognition engine.

74. The method of claim 73 wherein the recognition engine is a software program running in a general purpose microprocessor.

75. The method of claim 62 wherein the first system is a local computer and the external system is an internet web site, and the first and second recognition information are downloaded from the internet web site to the local computer to recognize the first and second plurality of words.

76. The method of claim 62 wherein the first system is connected to the second system over a wireless connection.

77. A computer-readable storage medium including software for performing a speech recognition method, the method comprising:
supplying a first system with first information from an external source, the first information for recognizing a spoken utterance in a first limited set of candidate utterances;
programming the first system with the first information to recognize the first limited set of candidate utterances;
generating first results in response to receiving a spoken utterance in the first limited set of candidate utterances in the first system;
supplying the first system with second information from the external source, the second information for recognizing a spoken utterance in a second limited set of candidate utterances, wherein the second information is selected based on the first results; and
programming the first system with the second information to recognize the second limited set of candidate utterances.

78. The method of claim 77 wherein the first system includes a recognition engine.

79. The method of claim 78 wherein the recognition engine is a software program running in a general purpose microprocessor.

80. The method of claim 77 wherein the first system is a base unit.

81. The method of claim 80 wherein the base unit is an internet access device.

82. The method of claim 77 wherein the first system is connected to the external source over an internet.

83. The method of claim 77 wherein the first system is connected to the external source over an intranet.

84. The method of claim 77 wherein the external source is a server.

85. The method of claim 84 wherein the first system receives the first and second information from a web site.

86. The method of claim 77 wherein the first system includes means for recognizing speech and means for coupling the first system to the external source.

87. The method of claim 77 wherein the first system is a local computer and the external source is an internet web site, and the first and second information are downloaded from the internet web site to the local computer for recognizing the first and second limited set of candidate utterances.

88. The method of the claim 77 wherein the first system is connected to the external source over a wireless connection.

89. A computer-readable storage medium including software for performing a speech recognition method, the method comprising:

downloading first information to a first computer from a server, the first information including data to recognizing an utterance in a first limited set of candidate utterances;

programming the first computer with the first information to recognize the first limited set of candidate utterances;

receiving a spoken utterance in the first limited set of candidate utterances in the first computer;

generating first recognition results in response to receiving the spoken utterance;

downloading second information to the first computer from the server, the second information including data to recognizing an utterance in a second limited set of candidate utterances, wherein the second information is selected based on the first recognition results; and programming the first computer with the second information to recognize the second limited set of candidate utterances.

90. The method of claim 89 wherein the first computer includes a recognition engine.

91. The method of claim 90 wherein the recognition engine is a software program running in a general purpose microprocessor.

92. The method of claim 89 wherein the first computer is connected to the server over an internet.

93. The method of claim 89 wherein the first computer is connected to the server over an intranet.

94. The method of claim 89 wherein the first computer is connected to the server over a local network.

95. The method of claim 89 wherein the first computer receives the first and second information from a web site.

96. The method of claim 89 wherein the server is an internet web site, and the first and second information are downloaded from the internet web site to the first computer for recognizing the first and second limited set of candidate utterances.

97. The method of claim 89 further comprising receiving data from the server.

98. The method of claim 97 wherein the data is audio data.

99. The method of claim 97 wherein the data is video data.

100. The method of claim 99 further comprising prompting a user to input a spoken utterance in the first limited set of candidate utterances.

101. The method of claim 100 further comprising prompting a user to input a spoken utterance in the second limited set of candidate utterances.

102. The method of claim 89 wherein recognition is performed using speaker-independent speech recognition.

103. The method of claim 102 wherein the first and second information comprise neural network weights.

104. The method of claim 89 wherein the first computer is connected to the server over a wireless connection.

* * * * *